United States Patent
Sakiyama

(10) Patent No.: US 10,719,227 B2
(45) Date of Patent: Jul. 21, 2020

(54) IMAGE PROCESSING APPARATUS, METHOD FOR DISPLAYING IMAGE, AND NON-TRANSITORY RECORDING MEDIUM STORING COMPUTER READABLE PROGRAM

(71) Applicant: KONICA MINOLTA, INC., Chiyoda-ku, Tokyo (JP)

(72) Inventor: Daisuke Sakiyama, Kawanishi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/022,545

(22) Filed: Jun. 28, 2018

(65) Prior Publication Data

US 2019/0018582 A1 Jan. 17, 2019

(30) Foreign Application Priority Data

Jul. 13, 2017 (JP) .................................. 2017-137075

(51) Int. Cl.
*G06F 3/041* (2006.01)
*G06F 3/0488* (2013.01)
(Continued)

(52) U.S. Cl.
CPC .......... *G06F 3/04883* (2013.01); *G06F 3/017* (2013.01); *G06F 3/042* (2013.01);
(Continued)

(58) Field of Classification Search
None
See application file for complete search history.

(56) References Cited

U.S. PATENT DOCUMENTS 8,487,886 B2 7/2013 Tsuzaki et al.
9,386,174 B2 7/2016 Ueda et al.
(Continued)

FOREIGN PATENT DOCUMENTS

CN 103858084 A 6/2014
CN 104144276 A 11/2014
(Continued)

OTHER PUBLICATIONS

Chinese Office Action dated Jul. 18, 2019 (and English translation thereof) issued in counterpart Chinese Application No. 201810760333.2.

(Continued)

*Primary Examiner* — Joseph R Haley
(74) *Attorney, Agent, or Firm* — Holtz, Holtz & Volek PC

(57) ABSTRACT

An image processing apparatus for enlarging or reducing an image in accordance with operation on a touch-sensitive panel display to display the image in the touch-sensitive panel display is provided. When an N-th gesture is pinch-out, the image processing apparatus enlarges the image enlarged in response to an (N-1)-th gesture at a magnification higher than a magnification for the (N-1)-th gesture to display a resulting image in the touch-sensitive panel display, provided that the (N-1)-th gesture is pinch-out and that the two gestures are common in finger movement. When the N-th gesture is pinch-in, the image processing apparatus reduces the image reduced in response to the (N-1)-th gesture at a magnification lower than a magnification for the (N-1)-th gesture to display a resulting image in the touch-sensitive panel display, provided that the (N-1)-th gestures are common in finger movement.

16 Claims, 22 Drawing Sheets

|  | FIRST TIME | SECOND TIME | THIRD TIME | FOURTH TIME | FIFTH TIME |
|---|---|---|---|---|---|
| UNIT CHANGE RATIO R | 10% | 20% | 30% | 20% | 10% |
| RESULT OF DETERMINATION | PINCH-OUT | PINCH-OUT | PINCH-OUT | PINCH-IN | PINCH-OUT |

(51) Int. Cl.
  *G06F 3/042* (2006.01)
  *G06F 3/01* (2006.01)
  *H04N 1/00* (2006.01)

(52) U.S. Cl.
  CPC ....... *G06F 3/0412* (2013.01); *H04N 1/00381* (2013.01); *H04N 1/00392* (2013.01); *H04N 1/00395* (2013.01); *H04N 1/00411* (2013.01); *G06F 2203/04806* (2013.01); *G06F 2203/04808* (2013.01)

(56) References Cited

U.S. PATENT DOCUMENTS

| | | | |
|---|---|---|---|
| 9,594,432 B2 | 3/2017 | Kuramatsu | |
| 2013/0036382 A1 | 2/2013 | Yuan et al. | |
| 2013/0162569 A1* | 6/2013 | Sudo | G06F 3/04845 345/173 |
| 2013/0257772 A1* | 10/2013 | Sudou | G06F 3/0412 345/173 |
| 2016/0198052 A1* | 7/2016 | Shogaki | H04N 1/00392 358/1.15 |
| 2019/0018582 A1 | 1/2019 | Sakiyama | |

FOREIGN PATENT DOCUMENTS

| | | |
|---|---|---|
| CN | 109257516 A | 1/2019 |
| JP | H1069345 A | 3/1998 |
| JP | 2009187057 A | 8/2009 |
| JP | 2010061299 A | 3/2010 |
| JP | 2015032261 A | 2/2015 |
| JP | 2016218859 A | 12/2016 |
| JP | 2016224688 A | 12/2016 |
| WO | 2012111060 A1 | 8/2012 |

OTHER PUBLICATIONS

Chinese Office Action dated Oct. 8, 2019 (and English translation thereof) issued in Chinese Application No. 201810760333.2.
Chinese Office Action dated Jan. 19, 2020 (and English translation thereof) issued in Chinese Application No. 201810760333.2.

* cited by examiner

FIG. 10

| | FIRST TIME | SECOND TIME | THIRD TIME | FOURTH TIME | FIFTH TIME |
|---|---|---|---|---|---|
| UNIT CHANGE RATIO R | 10% | 20% | 30% | 20% | 10% |
| RESULT OF DETERMINATION | PINCH-OUT | PINCH-OUT | PINCH-OUT | PINCH-IN | PINCH-OUT |

F I G. 12

| | FIRST TIME | SECOND TIME | THIRD TIME | FOURTH TIME | FIFTH TIME |
|---|---|---|---|---|---|
| UNIT CHANGE RATIO R | 10% | 20% | 30% | 10% | 20% |
| RESULT OF DETERMINATION | PINCH-OUT | PINCH-OUT | PINCH-OUT | PINCH-IN | PINCH-IN |

FIG. 13

|  | HIGH SPEED | LOW SPEED |
|---|---|---|
| HIGH RESOLUTION | 20% | 10% |
| LOW RESOLUTION | 10% | 5% |

IMAGE PROCESSING APPARATUS, METHOD FOR DISPLAYING IMAGE, AND NON-TRANSITORY RECORDING MEDIUM STORING COMPUTER READABLE PROGRAM

The entire disclosure of Japanese Patent Application No. 2017-137075, filed on Jul. 13, 2017, is incorporated herein by reference in its entirety.

BACKGROUND

1. Technological Field

The present invention relates to a technology for enlarging or reducing an image displayed in a touch-sensitive panel display of an image processing apparatus such as a multifunction device or a Multi-Functional Peripheral (MFP).

2. Description of the Related Art

Recent years have seen the widespread use of image processing apparatuses into which various functions such as copying, network printing, faxing, scanning, and file server are integrated. Such an image processing apparatus is called a "multifunction device" or a "Multi-Functional Peripheral (MFP)".

Such an image processing apparatus is provided with a touch-sensitive panel in which to display different screens and to receive user operation. A user makes a pinch-out gesture on the touch-sensitive panel to zoom in an image displayed therein. The user makes a pinch-in gesture on the touch-sensitive panel to zoom out the image displayed therein.

As technologies for rescaling a screen displayed in the touch-sensitive panel, the following technologies have been proposed.

One of the technologies is related to a display device. When the amount of a specific kind of information displayed on a display screen of the display device is larger than a predetermined threshold, a display control part increases the display size of a display object using an enlargement rate such that the amount of the information becomes smaller than the threshold (English abstract of Japanese Laid-open Patent Publication No. 2015-032261).

Another one of the technologies is related to an image processing apparatus. The image processing apparatus includes a detection means for detecting coordinates inputted with a pen and a writing pressure by the pen. When the pen is used to specify an image, the image processing apparatus determines, based on the writing pressure, a speed for enlargement or reduction. The image processing apparatus then enlarges or reduces image date sequentially with respect to the input coordinates, enabling a desired enlarged image or reduced image to be obtained (English abstract of Japanese Laid-open Patent Publication No. 10-069345).

Still another one of the technologies is related to an information input device. The information input device acquires position information and area information of an external proximity object in a detection signal processing part and an image processing part based on a detection signal of the external proximity object obtained by an input/output panel. A control part uses the acquired position information and area information to generate display data such that the size of a display object designated by the external proximity object changes according to an area value of the external proximity object (English abstract of Japanese Laid-open Patent Publication No. 2010-061299).

Still another one of the technologies is related to a portable terminal serving as an information processing device. The portable terminal includes: a surface touch determination unit that if an input to a touch panel is a surface touch, sets a mode of its own device to an enlargement/reduction mode; and an enlargement/reduction execution unit that enlarges or reduces an image according to at least two pieces of touch position information which are output in response to a drag operation received in the touch panel in the enlargement/reduction mode (English abstract of Japanese Laid-open Patent Publication No. 2016-224688).

Still another one of the technologies is related to a portable terminal serving as an information processing device. The portable terminal includes: an enlargement/reduction key that receives an operation to set a mode of its own device to an image enlargement/reduction mode; and an enlargement/reduction execution unit that enlarges or reduces an image according to at least two pieces of touch position information which are output in response to a drag operation received in the touch panel in the enlargement/reduction mode (English abstract of Japanese Laid-open Patent Publication No. 2016-218859).

Still another one of the technologies is related to a display device. A CPU of the display device sets a display area in a display area change part, and displays a partial image that is a part of an image generated based on data read out from a storage part and included in the display area on a display part. When a touch panel equipped in the front of the display part detects contact, the expanded display area is set in the display area change part. When the touch panel detects drag operation, a position in the image of the display area set in the display area change part is changed according to a movement direction and a movement distance of a contact position of the drag operation, and the partial image is scroll-displayed on the display part. When the touch panel has not detected any more contacts, the expanded display area is changed into the display area of normal size (English abstract of Japanese Laid-open Patent Publication No. 2009-187057).

Still another one of the technologies is related to an electronic device. The electronic device includes a touch position receiving unit for receiving, from a touch panel, touch position information indicating a touch position, onto the touch panel, of each of a first object and at least one of second objects different from the first object, a change type setting unit which calculates a movement direction of each of the first object and the second object based on the touch position information to determine a change type of a display of the touch panel based on the movement direction, and a change amount setting unit which recognizes the number of the second objects based on the touch position information to determine a change amount of the display based on the number (WO 2012/111060).

The pinch-out gesture is intuitive operation for enlarging a screen as compared to operation for typing/selecting a magnification. The pinch-in gesture is also intuitive operation for reducing a screen as compared to operation for typing/selecting a magnification.

The size of a region within which a user can make a pinch-out or pinch-in gesture corresponds to the size of a touch-sensitive panel. A small touch-sensitive panel forces the user to make slight pinch-out or pinch-in operation (finger movement) per gesture. This then forces the user to perform the operation repeatedly to enlarge or reduce a screen displayed in the small touch-sensitive panel to a screen size desired by him/her.

Image processing apparatuses are usually provided with a small touch-sensitive panel. Accordingly, the user sometimes has to repeat the pinch-out or pinch-in gesture to rescale the screen displayed in the touch-sensitive panel to his/her desired size.

Unfortunately, the technologies disclosed in the foregoing documents cannot reduce the burden on the user who makes the pinch-out or pinch-in gestures repeatedly.

SUMMARY

The present invention has been achieved in light of such a problem, and therefore, an object of an embodiment of the present invention is to reduce, as compared to the conventional technologies, the burden on a user when he/she makes a pinch-out or pinch-in gesture to enlarge or reduce a screen.

To achieve at least one of the abovementioned objects, according to an aspect of the present invention, an image processing apparatus reflecting one aspect of the present invention is an image processing apparatus for enlarging or reducing an image in accordance with operation on a touch-sensitive panel display to display the image in the touch-sensitive panel display. The image processing apparatus includes a hardware processor configured to, when an N-th gesture (N≥2) is a pinch-out gesture, enlarge the image enlarged in response to an (N-1)-th gesture at a magnification higher than a magnification for the (N-1)-th gesture to display a resulting image in the touch-sensitive panel display, provided that the (N-1)-th gesture is also a pinch-out gesture and that the two pinch-out gestures are common in finger movement, and, when the N-th gesture is a pinch-in gesture, reduce the image reduced in response to the (N-1)-th gesture at a magnification lower than a magnification for the (N-1)-th gesture to display a resulting image in the touch-sensitive panel display, provided that the (N-1)-th gesture is also a pinch-in gesture and that the two pinch-in gestures are common in finger movement.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 10 is a diagram showing an example of the transition of settings of a unit change ratio.

FIG. 12 is a diagram showing an example of the transition of a unit change ratio.

FIG. 13 is a diagram showing an example of initial values set in accordance with a combination of a speed of a finger movement and a resolution level of a scanned image.

DETAILED DESCRIPTION OF THE EMBODIMENTS

Hereinafter, one or more embodiments of the present invention will be described with reference to the drawings. However, the scope of the invention is not limited to the disclosed embodiments.

Figure 1:
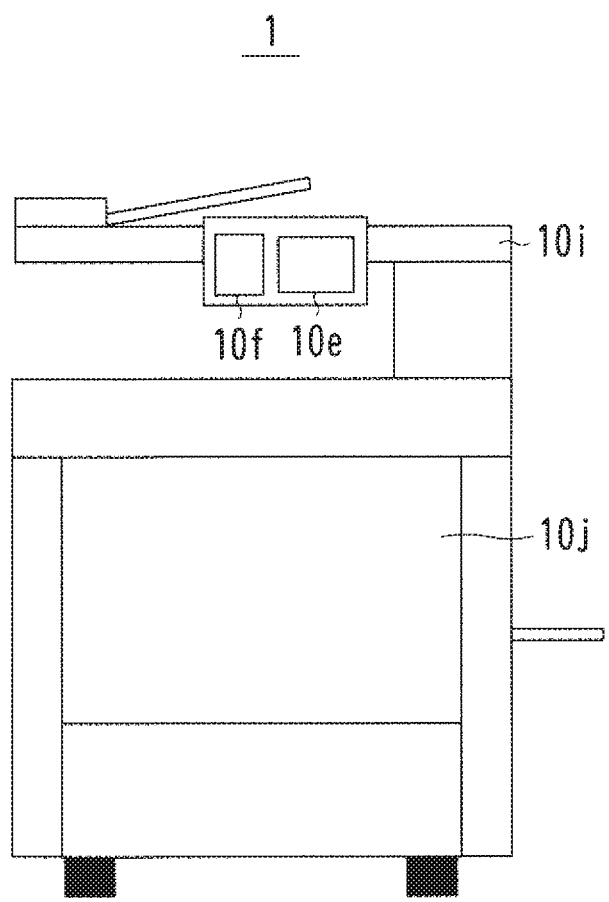
FIG. 1 is an external view of an image forming apparatus.
Figure 2:
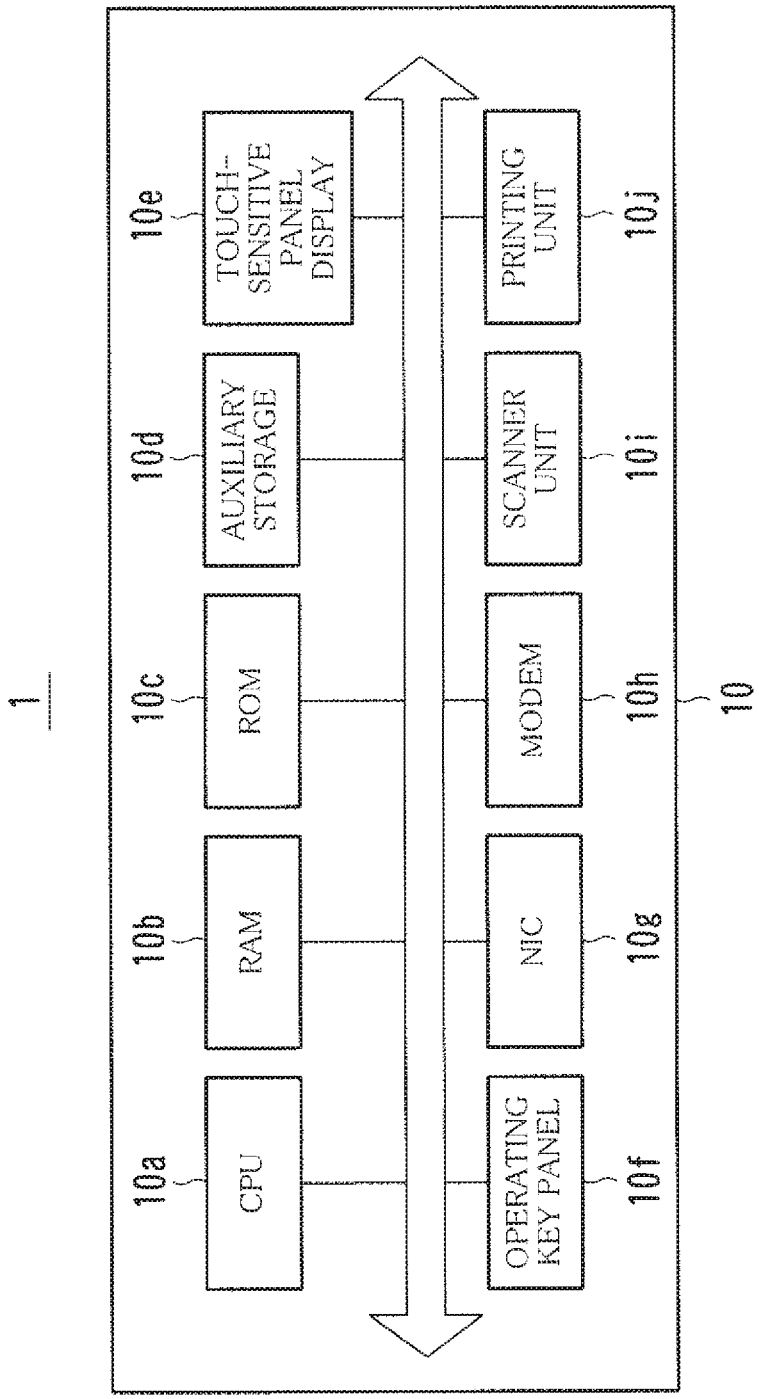
FIG. 2 is a diagram showing an example of the hardware configuration of an image forming apparatus.
Figure 3:
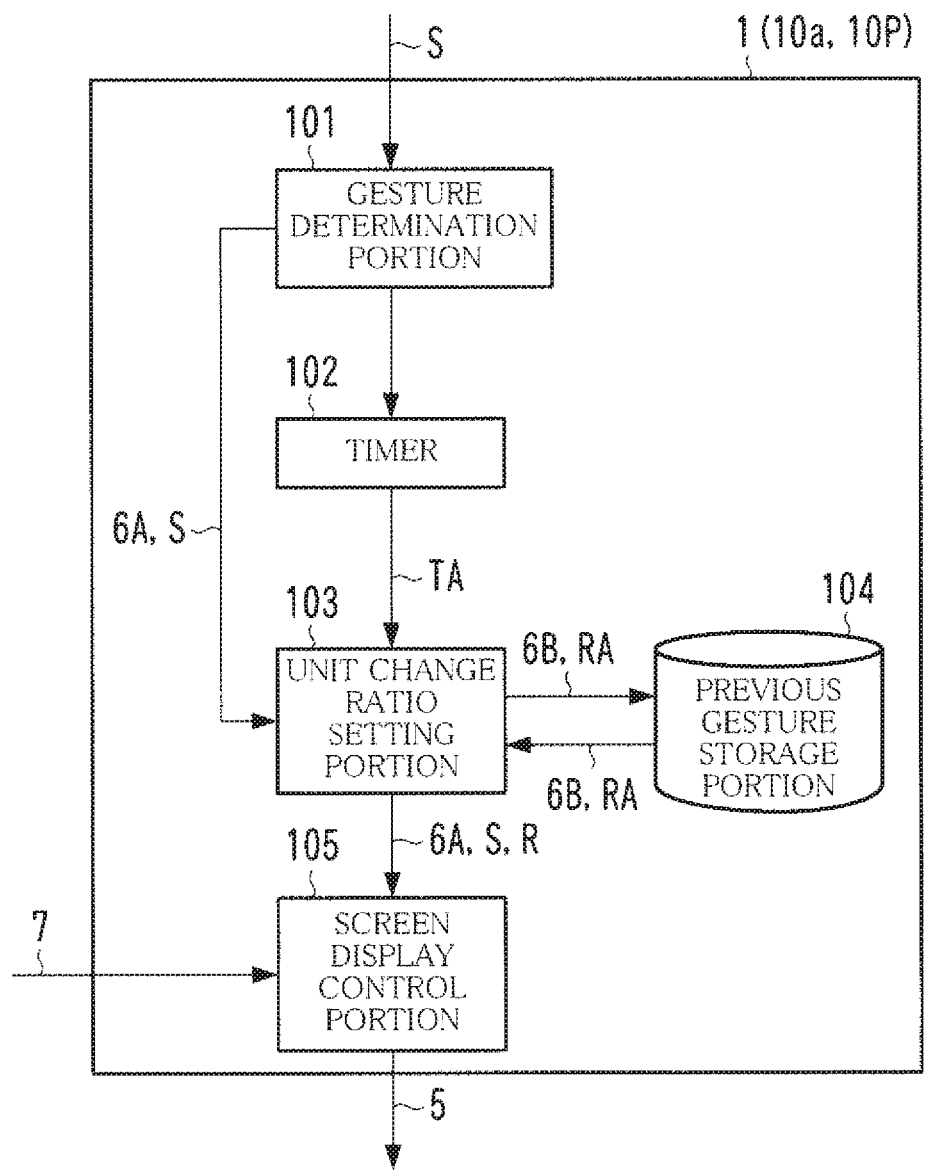
FIG. 3 is a diagram showing an example of the functional configuration of an image forming apparatus.

FIG. 1 is an external view of an image forming apparatus 1. FIG. 2 is a diagram showing an example of the hardware configuration of the image forming apparatus 1. FIG. 3 is a diagram showing an example of the functional configuration of the image forming apparatus 1.

The image forming apparatus 1 shown in FIG. 1 is an image processing apparatus into which functions such as copying, PC printing, faxing, scanning, and a box function are integrated. The image forming apparatus 1 is generally called a "multifunction device", a "Multi-Functional Peripheral (MFP)", or the like.

The PC printing function is to print an image onto paper based on image data received from a personal computer, a tablet computer, or a smartphone. The PC printing function is sometimes called "network printing" or "network print".

According to the box function, each user is given a storage area called a "box" or a "personal box". The box function enables each user to save image data and so on to his/her storage area and to manage the image data and so on therein. A box is allocated to each group so that the box can be shared by members of the group. The box corresponds to a "folder" or a "directory" in a personal computer.

Referring to FIG. 1 or 2, the image forming apparatus 1 is configured of a Central Processing Unit (CPU) 10a, a Random Access Memory (RAM) 10b, a Read Only Memory (ROM) 10c, an auxiliary storage 10d, a touch-sensitive panel display 10e, an operating key panel 10f, a Network Interface Card (NIC) 10g, a modem 10h, a scanner unit 10i, a printing unit 10j, and so on.

The touch-sensitive panel display 10e displays, for example, a screen for presenting messages to the user, a screen for allowing the user to enter commands or information, or a screen for showing the results of processing executed by the CPU 10a, and so on. The touch-sensitive panel display 10e also sends a signal indicating a touched location to the CPU 10a.

The size of the touch-sensitive panel display 10e is smaller than the size of user's open hand. For example, the touch-sensitive panel display 10e is approximately 10 centimeters long and 15 centimeters wide.

The operating key panel 10f is a so-called hardware keyboard. The operating key panel 10f has numeric keys, a start key, a stop key, and function keys, for example.

The NIC 10g performs communication with other device in accordance with a protocol such as Transmission Control Protocol/Internet Protocol (TCP/IP).

The modem 10h sends/receives image data with a facsimile terminal in accordance with a protocol such as G3.

The scanner unit 10i optically reads an image recorded on a sheet placed on a platen glass to generate image data thereof.

The printing unit 10j prints, onto paper, the image captured by the scanner unit 10i and an image sent by other device and received by the NIC 10g or the modem 10h.

The ROM 10c or the auxiliary storage 10d stores, therein, programs for enabling the foregoing functions such as copying. The ROM 10c or the auxiliary storage 10d also stores, therein, a preview program 10P (see FIG. 3). The preview program 10P is described later. The programs are loaded into the RAM 10b as needed and executed by the CPU 10a. Examples of the auxiliary storage 10d include a hard disk drive and a Solid State Drive (SSD).

The preview program 10P is to provide the user with a service of scan preview. According to the scan preview service, the image captured from paper by the scanner unit 10i is displayed in the form of a preview window. The preview window allows the user to preview and check whether or not the image has been captured from the paper in a desirable manner.

The preview program 10P implements, in the image forming apparatus 1, the functions of a gesture determination portion 101, a timer 102, a unit change ratio setting portion 103, a previous gesture storage portion 104, and a screen display control portion 105, all of which are shown in FIG. 3. The operations by the gesture determination portion 101 through the screen display control portion 105 are hereinafter described with reference to FIGS. 4 through 15.

Figure 4A:
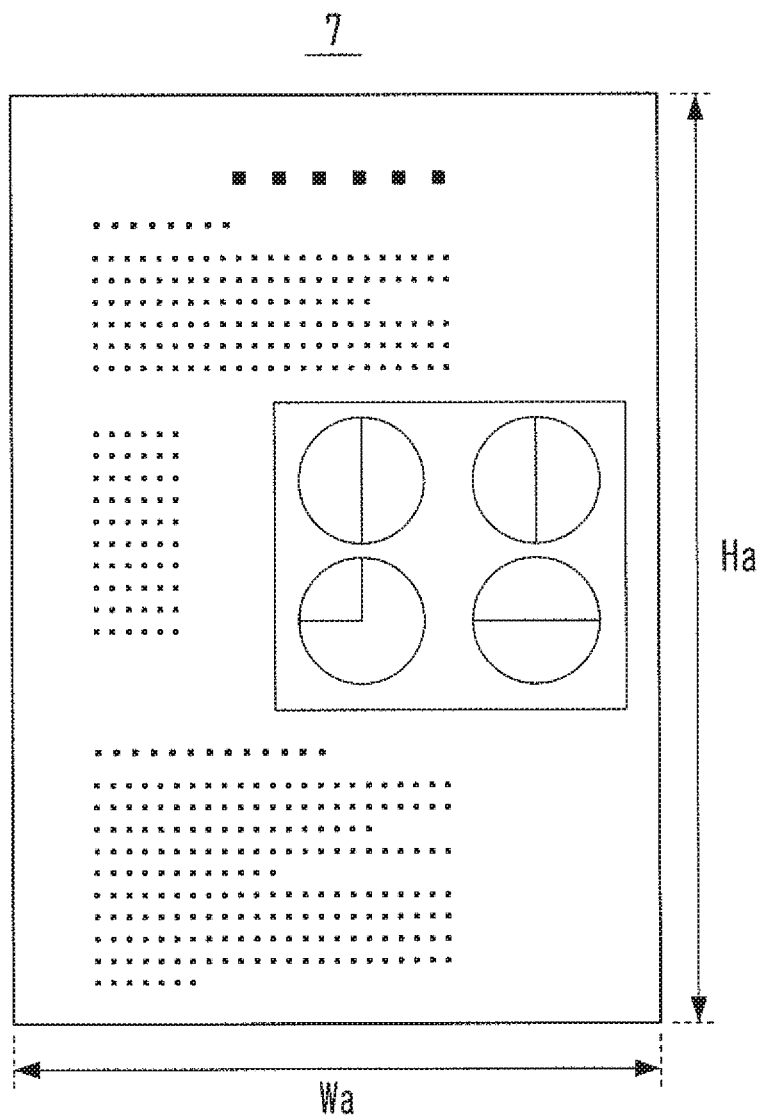
FIG. 4A is a diagram showing an example of a scanned image.
Figure 4B:
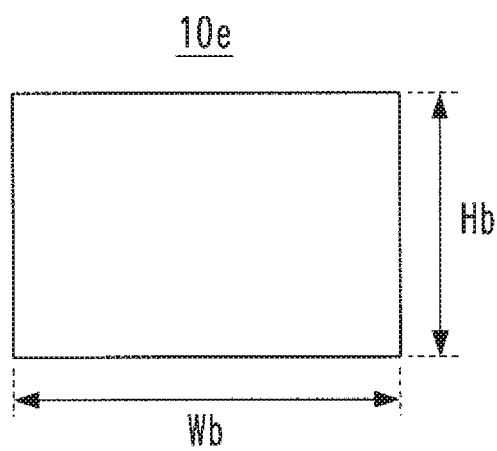
FIG. 4B is a diagram showing an example of the size of a touch-sensitive panel display.
Figure 5:
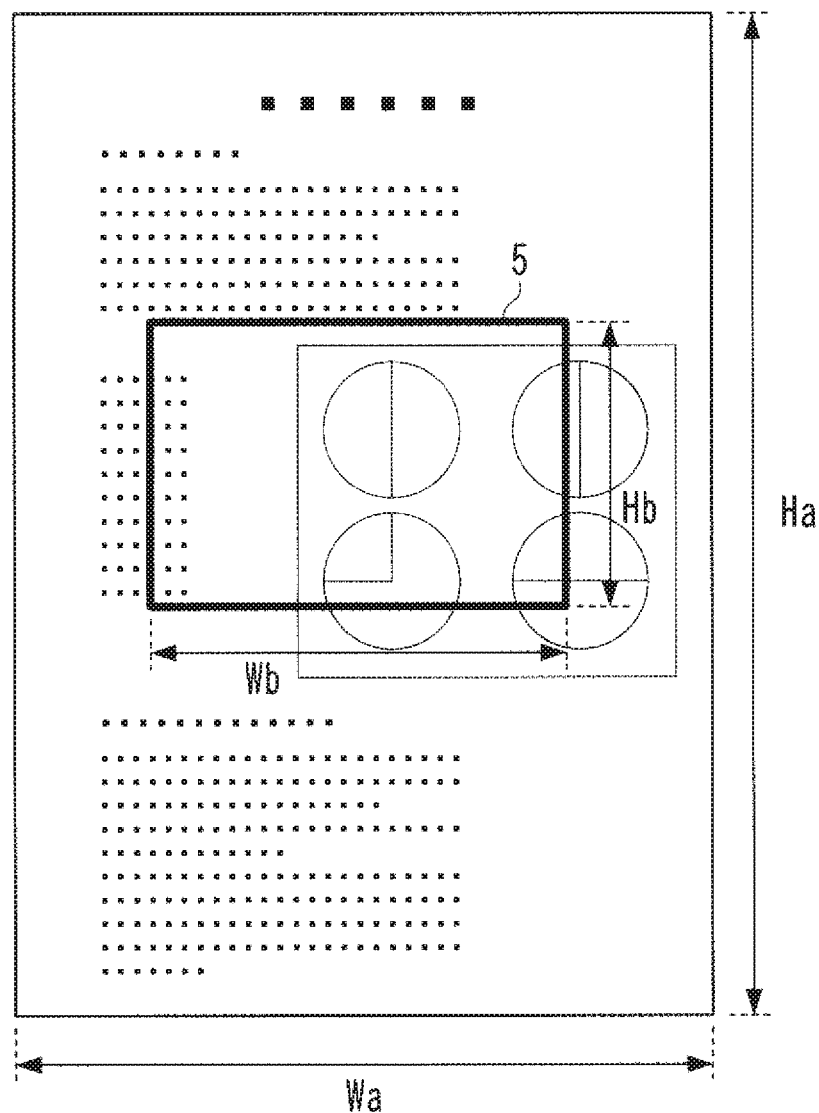
FIG. 5 is a diagram showing an example of a relationship between a scanned image and a preview window.

FIG. 4A is a diagram showing an example of a scanned image 7, and FIG. 4B is a diagram showing an example of the size of the touch-sensitive panel display 10e. FIG. 5 is a diagram showing an example of a relationship between the scanned image 7 and a preview window 5.

The user places, in the scanner unit 10i, paper on which an image to be scanned is depicted. The user then enters a predetermined command into the image forming apparatus 1. In response to the command entry, the scanner unit 10i optically reads the image depicted on the paper to generate image data of that image.

The following description takes an example in which an image such as that shown in FIG. 4A is captured. The image thus captured is referred to as the "scanned image 7". The number of dots of the scanned image 7 shall be calculated by Ha×Wa.

As shown in FIG. 4B, the touch-sensitive panel display 10e has a touch-sensitive panel and a display each of which has a resolution (number of dots) of Hb×Wb. It is noted that Ha is greater than Hb (Ha>Hb) and Wa is greater than Wb (Wa>Wb).

The screen display control portion 105 displays, in the form of the preview window 5, a target region that is the whole or a part of the scanned image 7 in the touch-sensitive panel display 10e. Right after the image data is generated, a predetermined part of the scanned image 7 is selected as the target region. The screen display control portion 105 then displays the target region without enlarging and reducing the same, namely, displays the target region at the same magnification in the form of the preview window 5 in the touch-sensitive panel display 10e.

The predetermined part is preset arbitrarily. For example, an image contained in a thick frame as shown in FIG. 5 is set as the predetermined part. The predetermined part has dimensions of Hb×Wb, and has the same shape as that of the touch-sensitive panel display 10e. The predetermined part of the scanned image 7 is so positioned that the center of gravity of the predetermined part and the center of gravity of the scanned image 7 overlap with each other.

The user makes a swipe gesture or a flick gesture on the touch-sensitive panel display 10e so that he/she can change the target region.

In response to the swipe gesture or the flick gesture, the screen display control portion 105 identifies a new target region in accordance with the gesture, and displays the new target region as the preview window 5. At this time, it is desirable that the screen display control portion 105 displays the scanned image 7 in a manner to be scrolled from the target region displayed immediately before the gesture to the new target region.

The user makes a pinch-out gesture with his/her two fingers on the touch-sensitive panel display 10c. This allows the user to further decrease the target region, so that the scanned image 7 is displayed at a magnification higher than the current magnification.

The user makes a pinch-in gesture with his/her two fingers on the touch-sensitive panel display 10e. This allows the user to increase the target region, so that the scanned image 7 is displayed at a magnification lower than the current magnification.

The image forming apparatus 1 enables reduction, as compared to the conventional technologies, the burden on the user when he/she makes a pinch-out or pinch-in gesture to enlarge or reduce the whole or a part of the scanned image 7. The mechanism thereof is described below.

[Case Where the First-Time Pinch-Out or Pinch-In Gesture is Made]

Figure 6A:
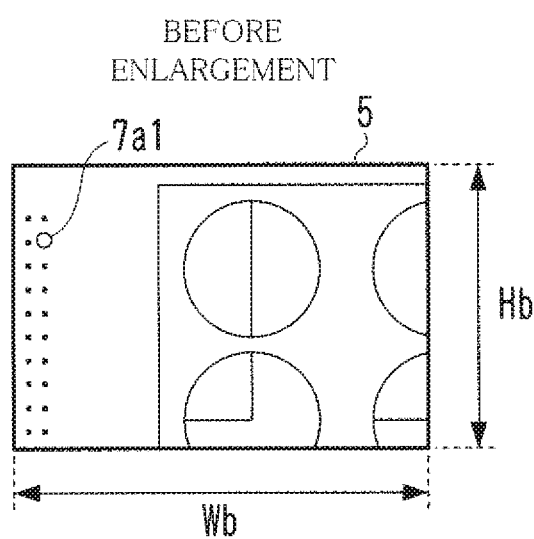
FIG. 6A is a diagram showing an example of a preview window in which a scanned image before enlargement is partly displayed.
Figure 6B:
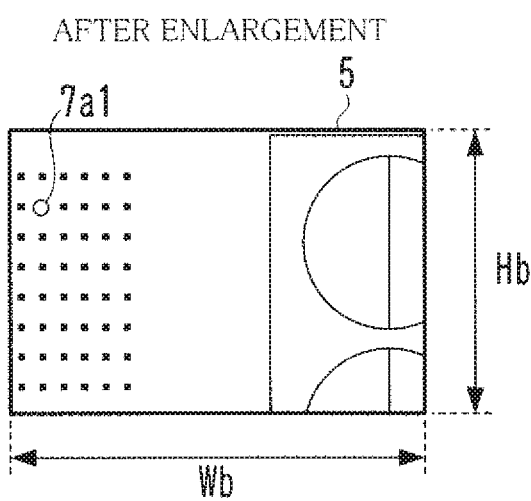
FIG. 6B is a diagram showing an example of a preview window in which a scanned image having been enlarged is partly displayed.
Figure 7A:
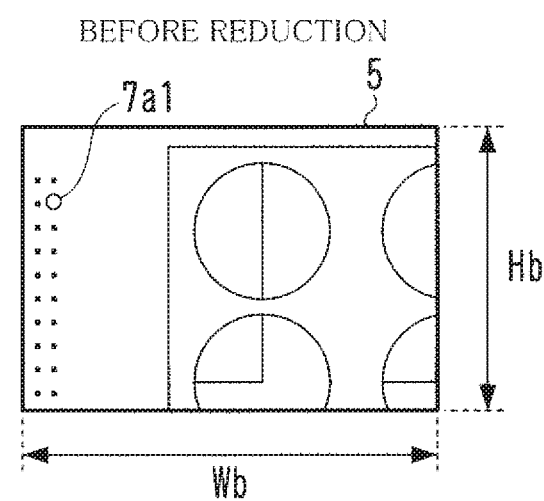
FIG. 7A is a diagram showing an example of a preview window in which a scanned image before reduction is partly displayed.
Figure 7B:
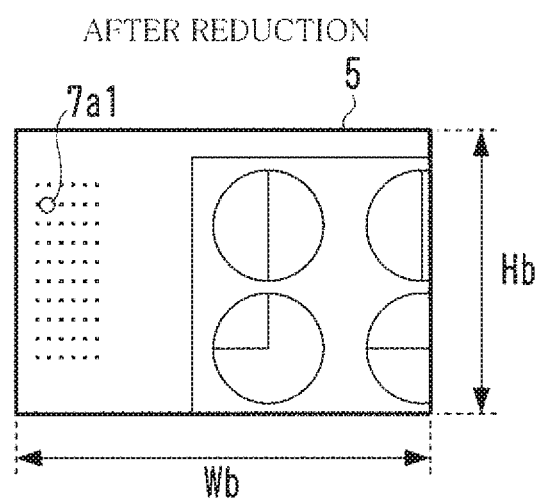
FIG. 7B is a diagram showing an example of a preview window in which a scanned image having been reduced is partly displayed.

FIG. 6A is a diagram showing an example of the preview window 5 in which the scanned image 7 before enlargement is partly displayed, and FIG. 6B is a diagram showing an example of the preview window 5 in which the scanned image 7 having been enlarged is partly displayed. FIG. 7A is a diagram showing an example of the preview window 5 in which the scanned image 7 before reduction is partly displayed, and FIG. 7B is a diagram showing an example of the preview window 5 in which the scanned image 7 having been reduced is partly displayed.

In order to enlarge or reduce a part of the scanned image 7 displayed as the preview window 5, the user makes a pinch-out or pinch-in gesture in the touch-sensitive panel display 10e.

While being touched by the user, the touch-sensitive panel display 10e generates, at regular intervals (at 0.1-second intervals, for example), a signal S that indicates coordinates of the touched location and sends the signal S to the gesture determination portion 101.

The gesture determination portion 101 receives the signals S one after another from the touch-sensitive panel display 10e. Where each of the signals S indicates coordinates of the two touched locations, the gesture determination portion 101 determines whether or not the gesture made by the user corresponds to any one of the pinch-out gesture and the pinch-in gesture based on the signals S in the following manner.

If a distance between the two touched locations indicated in the signal S received first is shorter than a distance between the two touched locations indicated in the signal S received secondarily or beyond, then the gesture determination portion 101 determines that the gesture made by the user is the pinch-out gesture.

If the distance between the two touched locations indicated in the signal S received first is longer than the distance between the two touched locations indicated in the signal S received secondarily or beyond, then the gesture determination portion 101 determines that the gesture made by the user is the pinch-in gesture.

The gesture determination portion 101 sends gesture data 6A that indicates the result of determination (pinch-out or pinch-in) and the signals S to the unit change ratio setting portion 103.

When the gesture determination portion 101 determines that the gesture made by the user corresponds to the pinch-out gesture or the pinch-in gesture, the timer 102 starts counting a time which has passed since the user made the gesture. Such a time is hereinafter referred to as an "elapsed time TA". It is preferable to count the elapsed time TA by using, as "0 (zero) seconds", i.e., as the start time, time at which the gesture determination portion 101 receives any one of the signals S. It is, however, desirable that the start time is time at which the gesture determination portion 101 receives the last signal S.

The unit change ratio setting portion 103 receives the gesture data 6A and the signals S from the gesture determination portion 101. The unit change ratio setting portion 103 then sets an initial value RV, which is a preset value, as a unit change ratio R.

The "unit change ratio R" is a value that represents how much the scanned image 7 is to be enlarged or reduced with respect to the current size of the scanned image 7 per predetermined length of the trail of a touch made by the user on the touch-sensitive panel display 10e. Hereinafter, a case is described in which the predetermined length is "1 cm (centimeter)" and the initial value RV is "10%".

For example, where the pinch-out or pinch-in gesture has a trail of 3 cm, processing described later is performed, so that a part of the scanned image 7 displayed as the preview window 5 is enlarged or reduced by an amount corresponding to "10%×3 cm", namely, "30%".

The unit change ratio setting portion 103 stores the gesture data 6A into the previous gesture storage portion 104 as last gesture data 6B. The unit change ratio setting portion 103 also stores the unit change ratio R into the previous gesture storage portion 104 as last unit change ratio RA. The unit change ratio setting portion 103 sends the unit change ratio R, the gesture data 6A, and the signals S to the screen display control portion 105.

The screen display control portion 105 calculates, based on the signals S received, the length of the trail of the touch with user's two fingers having moved for the pinch-out or pinch-in gesture in the touch-sensitive panel display 10e. Hereinafter, the length of the trail is referred to as a "travel distance L". A movement of both the two fingers creates two trails. In such a case, the screen display control portion 105 calculates the individual lengths of the two trails and adds up the lengths to obtain the travel distance L. A movement of only one finger creates one trail. In such a case, the screen display control portion 105 obtains the length of that one trail as the travel distance L. It is noted that a unit of the travel distance L is "cm".

For the pinch-out or pinch-in gesture, fingers move almost linearly. Taking this into consideration, the screen display control portion 105 may calculate, as the travel distance L, a distance between the first position and the last position of each of the two fingertips based on two coordinates indicated in the first signal S and two coordinates indicated in the last signal S for the pinch-out or pinch-in gesture.

The screen display control portion 105 calculates, as a change ratio P, the product of the travel distance L and the unit change ratio R.

If the gesture data 6A indicates the result "pinch-out gesture", then the screen display control portion 105 enlarges the scanned image 7 by an amount corresponding to the change ratio P. If the change ratio P is 30%, for example, then the screen display control portion 105 enlarges the scanned image 7 by 30%, namely, by 1.3 times.

The screen display control portion 105 then displays, in the touch-sensitive panel display 10e, a part of the enlarged scanned image 7 as the preview window 5 so that both of the following conditions (1_1) and (1_2) are satisfied.

(1_1) In the preview window 5 before this enlargement, the position of a pixel 7a1, which corresponds to the midpoint of a line segment connecting the two points indicated in the first signal S, has to be the same position of the pixel 7a1.

(1_2) The size (the number of pixels) of the part of the enlarged scanned image 7 has to be equal to the size (the number of pixels) of the touch-sensitive panel display 10e. In short, the former size (the number of pixels) and the latter size (the number of pixels) are Hb×Wb (dots) each.

To be specific, the screen display control portion 105 enlarges a part around the pixel 7a1 in the scanned image 7 to display the resulting part as the preview window 5 in the touch-sensitive panel display 10e. This allows the user to recognize that, as shown in FIGS. 6A and 6B, a part of the scanned image 7 before the pinch-out gesture is enlarged with respect to the pixel 7a1.

On the other hand, if the gesture data 6A indicates the result "pinch-in gesture", then the screen display control portion 105 reduces the scanned image 7 by an amount corresponding to the change ratio P. If the change ratio P is 30%, for example, then the screen display control portion 105 reduces the scanned image 7 by 30%, namely, by 0.7 times.

The screen display control portion 105 then displays, in the touch-sensitive panel display 10e, a part of the reduced scanned image 7 as the preview window 5 so that both of the following conditions (2_1) and (2_2) are satisfied.

(2_1) The position of the pixel 7a1 of the preview window 5 before this reduction has to be the same position of the pixel 7a1 after this reduction.

(2_2) The size (the number of pixels) of the part of the reduced scanned image 7 has to be equal to the size (the number of pixels) of the touch-sensitive panel display 10e. In short, the former size (the number of pixels) and the latter size (the number of pixels) are Hb×Wb (dots) each.

To be specific, the screen display control portion 105 reduces a part around the pixel 7a1 in the scanned image 7 to display the resulting part as the preview window 5 in the touch-sensitive panel display 10e. This allows the user to recognize that, as shown in FIGS. 7A and 7B, a part of the scanned image 7 before the pinch-in gesture is reduced toward the pixel 7a1.

When the scanned image 7 is reduced to have a width of Wb or smaller and to have a height of Hb or smaller, the entirety of the scanned image 7 is displayed as the preview window 5 in the touch-sensitive panel display 10e.

Meanwhile, when being reduced, the scanned image 7 sometimes has a height greater than Hb and a width smaller than Wb. In such a case, the screen display control portion 105 displays, in the touch-sensitive panel display 10e, a part of the post-reduction scanned image 7 satisfying both of the foregoing conditions (2_1) and (2_2), as the preview window 5, with a blank image disposed to the right or left of the part.

If the scanned image 7 which is horizontally long is reduced, the scanned image 7 sometimes has a width greater than Wb and a height smaller than Hb. In such a case, the screen display control portion 105 displays a part of the post-reduction scanned image 7 satisfying the foregoing conditions, as the preview window 5, with a blank image disposed above or below the part.

[Case Where the Second-Time and Beyond Pinch-Out or Pinch-In Gesture is Made]

Figure 8A:
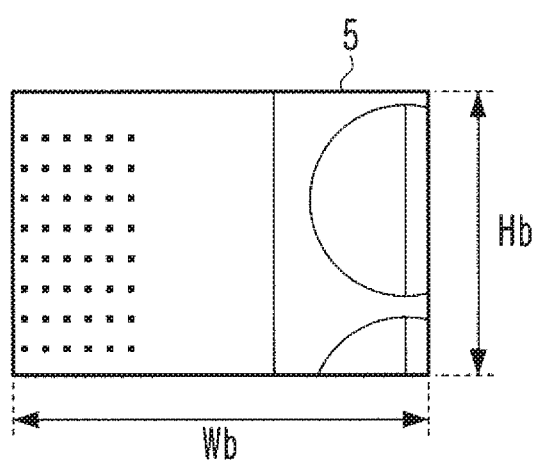
FIGS. 8A and 8B are diagrams showing examples of a preview window in which a part of a scanned image having been enlarged by using, as a unit change ratio, an initial value or large unit change ratio is displayed.
Figure 8B:
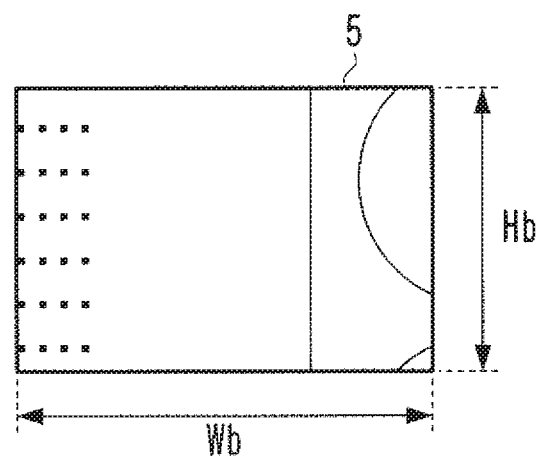
Figure 9A:
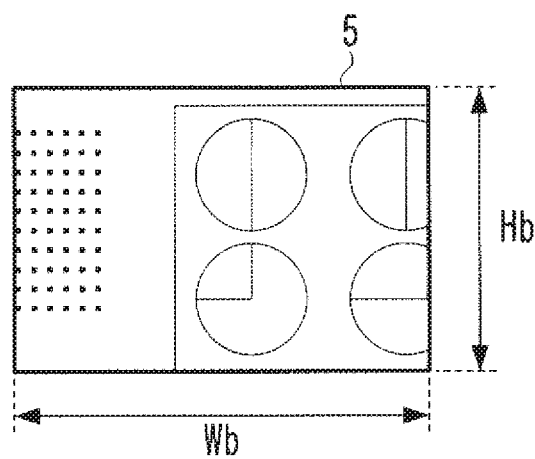
FIGS. 9A and 9B are diagrams showing examples of a preview window in which a part of a scanned image having been reduced by using, as a unit change ratio, an initial value or large unit change ratio is displayed.
Figure 9B:
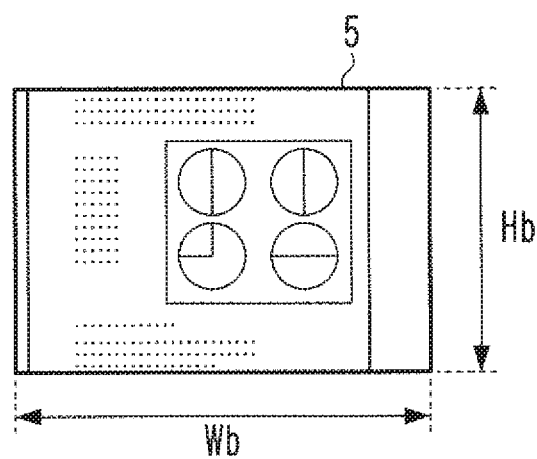

FIGS. 8A and 8B are diagrams showing examples of the preview window 5 in which a part of the scanned image 7 having been enlarged by using, as the unit change ratio R, the initial value RV or a large unit change ratio RB is displayed. FIGS. 9A and 9B are diagrams showing examples of the preview window 5 in which a part of the scanned image 7 having been reduced by using, as the unit change ratio RB, the initial value RV or the large unit change ratio RB is displayed.

In order to further enlarge or reduce the part of the enlarged or reduced scanned image 7 displayed as the preview window 5, the user makes again a pinch-out or pinch-in gesture in the touch-sensitive panel display 10e.

As with the case described earlier, while being touched by the user, the touch-sensitive panel display 10e obtains a signal S at regular intervals. The signal S for this pinch-out or pinch-in gesture, i.e., the N-th pinch-out or pinch-in gesture, is hereinafter referred to as a "signal SA".

The gesture determination portion 101 receives the signals SA from the touch-sensitive panel display 10e. As with the foregoing case, the gesture determination portion 101 determines, based on the signals SA, whether the gesture made by the user corresponds to the pinch-out gesture or the pinch-in gesture. The gesture determination portion 101 then sends the gesture data 6A indicating the result of determination and the signals SA to the unit change ratio setting portion 103.

If having already started counting the elapsed time TA for the last gesture, namely, the (N-1)-th gesture, then the timer 102 finishes counting time in response to the first signal SA received. The timer 102 then sends the elapsed time TA for the (N-1)-th gesture to the unit change ratio setting portion 103.

For example, if the first signal SA is received at a time when 0.5 seconds have elapsed since the start time, then the elapsed time TA is 0.5 seconds.

The timer 102 then starts counting elapsed time TA for the N-th gesture by using, as the start time, time at which the gesture determination portion 101 has received any one of the signals SA (preferably, the last signal SA).

Counting the elapsed time TA may be halted when a predetermined time TB (5 to 10 seconds, for example) has elapsed since the start time. In such a case, the timer 102 informs the unit change ratio setting portion 103 that the counting has been halted.

[Case Where the Pinch-Out or Pinch-In Gesture is Made as with the (N-1)-th Gesture]

If the (N-1)-th gesture is the pinch-out gesture and the N-th gesture is also the pinch-out gesture, or, alternatively, if the (N-1)-th gesture is the pinch-in gesture and the N-th gesture is also the pinch-in gesture, then the unit change ratio setting portion 103 and the screen display control portion 105 perform the following processing.

Where the timer 102 informs the unit change ratio setting portion 103 of the elapsed time TA, and, where the elapsed time TA is less than the predetermined time TB, the unit change ratio setting portion 103 sets the unit change ratio R as described below based on the gesture data 6A and the signals SA sent by the gesture determination portion 101 and the last gesture data 6B and last unit change ratio RA stored in the previous gesture storage portion 104.

When the result of determination indicated in the gesture data 6A is the same as that indicated in the last gesture data 6B, in other words, when the N-th gesture is the same as the (N-1)-th gesture, the unit change ratio setting portion 103 determines a large unit change ratio RB that has a value greater than the last unit change ratio RA to set the large unit change ratio RB as the unit change ratio R.

There are two methods for determining the large unit change ratio RB. The first method is a method for calculating, as the large unit change ratio RB, the sum of the last unit change ratio RA and the initial value RV (or a preset value). The second method is a method for calculating, as the large unit change ratio RB, the product of the last unit change ratio RA and a predetermined value greater than 1.

The description is provided below by taking an example where the first method is used. In such a case, supposing that the last unit change ratio RA is 10%, a value obtained by adding "10%" to the last unit change ratio RA, namely, 20%, is determined to be the large unit change ratio RB.

On the other hand, where the elapsed time TA exceeds the predetermined time TB, the unit change ratio setting portion 103 sets the initial value RV as the unit change ratio R. In a like manner, when being informed that the counting has been suspended, the unit change ratio setting portion 103 sets the initial value RV as the unit change ratio R.

It is supposed that the trail of the pinch-out or pinch-in gesture is 2 cm, for example. In such a case, the processing described later is performed to enlarge or reduce a part of the scanned image 7 displayed in the form of preview window 5 by an amount corresponding to "20%×2 cm", namely, "40%", as long as the elapsed time TA is less than the predetermined time TB. When the elapsed time TA exceeds the predetermined time TB, the part of the scanned image 7 is enlarged or reduced by an amount corresponding to "10%×2 cm", namely, "20%".

The case where the result of determination indicated in the gesture data 6A is different from that indicated in the last gesture data 6B, e.g., the case where the pinch-in gesture follows the pinch-out gesture, is described later.

After setting the unit change ratio R, the unit change ratio setting portion 103 deletes the last gesture data 6B and last unit change ratio RA stored in the previous gesture storage portion 104. The unit change ratio setting portion 103 then stores, as the last gesture data 6B, the gesture data 6A received together with the signals SA into the previous gesture storage portion 104, as with the foregoing case.

The unit change ratio setting portion 103 stores the set unit change ratio R into the previous gesture storage portion 104 as the last unit change ratio RA. Stated differently, when the large unit change ratio RB is determined, the unit change ratio setting portion 103 stores, as the last unit change ratio RA, the large unit change ratio RB into the previous gesture storage portion 104. Otherwise, the unit change ratio setting portion 103 stores, as the last unit change ratio RA, the initial value RV into the previous gesture storage portion 104.

The unit change ratio setting portion 103 sends the gesture data 6A and the set unit change ratio R together with the signals SA to the screen display control portion 105.

As with the foregoing case, the screen display control portion 105 calculates the travel distance L based on the signals SA. The screen display control portion 105 calculates the product of the travel distance L thus calculated and the unit change ratio R set by the unit change ratio setting portion 103, and then determines the product to be the change ratio P.

Where the user intends to further enlarge, in the scanned image 7 enlarged by the (N-1)-th gesture, a part displayed as the preview window 5, in other words, where the result indicated in the gesture data 6A is the pinch-out gesture, the screen display control portion 105 enlarges again that scanned image 7 by an amount corresponding to the change ratio P. The screen display control portion 105 displays, in the touch-sensitive panel display 10e, as the preview window 5, a part of the enlarged scanned image 7 in such a manner that both of the conditions (1_1) and (1_2) are satisfied.

It is supposed that: the (N-1)-th gesture made by the user is the pinch-out gesture and a part of the scanned image 7 is displayed as the preview window 5 as shown in FIG. 6B; and the travel distance L by the N-th pinch-out gesture is a "travel distance L1".

In such a case, when the initial value RV is set as the unit change ratio R, the change ratio P is determined to be RV×L1. In contrast, when the large unit change ratio RB is set as the unit change ratio R, the change ratio P is determined to be RB×L1. Since RV is smaller than RB (RV<RB), the relationship RV×L1<RB×L1 is established. For enlargement, as the change ratio P is greater, the magnification is larger.

Thus, the scanned image 7 is enlarged at a ratio smaller in the case of setting the initial value RV as the unit change ratio R than in the case of setting the large unit change ratio RB as the unit change ratio R. As shown in FIG. 8A, a part of the scanned image 7 is displayed as the preview window 5.

On the other hand, the scanned image 7 is enlarged at a ratio greater in the case of setting the large unit change ratio RB as the unit change ratio R than in the case of setting the initial value RV as the unit change ratio R. As shown in FIG. 8B, a part of the enlarged scanned image 7 is displayed as the preview window 5.

Where the user intends to further reduce, in the scanned image 7 reduced by the (N-1)-th gesture, a part displayed as the preview window 5, in other words, where the result indicated in the gesture data 6A is the pinch-in gesture, the screen display control portion 105 reduces again that scanned image 7 by an amount corresponding to the change ratio P. The screen display control portion 105 displays, in the touch-sensitive panel display 10e, as the preview window 5, a part of the reduced scanned image 7 in such a manner that both of the conditions (2_1) and (2_2) are satisfied.

It is supposed that: the (N-1)-th gesture made by the user is the pinch-in gesture and a part of the scanned image 7 is displayed as the preview window 5 as shown in FIG. 7B; and the travel distance L by the N-th pinch-in gesture is the "travel distance L1".

In such a case, as with the foregoing case, when the initial value RV is set as the unit change ratio R, the change ratio P is determined to be RV×L1. In contrast, when the large unit change ratio RB is set as the unit change ratio R, the change ratio P is determined to be RB×L1. The relationship RV×L1<RB×L1 is established. For reduction, as the change ratio P is greater, the magnification is smaller.

Thus, the scanned image 7 is reduced at a ratio greater in the case of setting the initial value RV as the unit change ratio R than in the case of setting the large unit change ratio RB as the unit change ratio R. As shown in FIG. 9A, a part of the scanned image 7 is displayed as the preview window 5.

On the other hand, the scanned image 7 is reduced at a ratio smaller in the case of setting the large unit change ratio RB as the unit change ratio R than in the case of setting the initial value RV as the unit change ratio R. As shown in FIG. 9B, a part of the reduced scanned image 7 is displayed as the preview window 5.

[Case Where the Pinch-Out or Pinch-In Gesture Different from the (N-1)-th Gesture is Made]

FIG. 10 is a diagram showing an example of the transition of settings of the unit change ratio R. If the (N-1)-th gesture is the pinch-out gesture and the N-th gesture is the pinch-in gesture, or, alternatively, if the (N-1)-th gesture is the pinch-in gesture and the N-th gesture is the pinch-out gesture, then the unit change ratio setting portion 103 and the screen display control portion 105 perform the following processing.

Where the timer 102 informs the unit change ratio setting portion 103 of the elapsed time TA, and, where the elapsed time TA is less than the predetermined time TB, the unit change ratio setting portion 103 sets the unit change ratio R as described below based on the gesture data 6A and the signals SA sent by the gesture determination portion 101 and the last gesture data 6B and last unit change ratio RA stored in the previous gesture storage portion 104.

When the result of determination indicated in the gesture data 6A is different from that indicated in the last gesture data 6B, in other words, when the N-th gesture is different from the (N-1)-th gesture, the unit change ratio setting portion 103 determines a small unit change ratio RC that has a value smaller than the last unit change ratio RA to set the small unit change ratio RC as the unit change ratio R.

There are two methods for determining the small unit change ratio RC. The first method is a method for calculating, as the small unit change ratio RC, a value obtained by deducting the initial value RV (or a preset value) from the last unit change ratio RA. The second method is a method for calculating, as the small unit change ratio RC, a quotient of the last unit change ratio RA divided by a predetermined value greater than 1.

It should be noted that, when the value determined by the unit change ratio setting portion 103 is smaller than the initial value RV, the initial value RV is set as the small unit change ratio RC.

The description is provided below by taking an example where the first method is used. In such a case, supposing that the last unit change ratio RA is 30%, a value obtained by deducting "10%" from the last unit change ratio RA, namely, 20%, is determined to be the small unit change ratio RC.

On the other hand, where the elapsed time TA exceeds the predetermined time TB, or, alternatively, where the unit change ratio setting portion 103 is informed that the counting has been suspended, the unit change ratio setting portion 103 sets the initial value RV as the unit change ratio R, as with the foregoing case.

The unit change ratio setting portion 103 deletes the last gesture data 6B and last unit change ratio RA stored in the previous gesture storage portion 104 as with the foregoing case. The unit change ratio setting portion 103 then stores, as the last gesture data 6B, the gesture data 6A received together with the signals SA into the previous gesture storage portion 104.

The unit change ratio setting portion 103 stores the set unit change ratio R into the previous gesture storage portion 104 as the last unit change ratio RA. Stated differently, when the small unit change ratio RC is determined, the unit change ratio setting portion 103 stores, as the last unit change ratio RA, the small unit change ratio RC into the previous gesture storage portion 104. Otherwise, the unit change ratio setting portion 103 stores, as the last unit change ratio RA, the initial value RV into the previous gesture storage portion 104.

As with the foregoing case, the unit change ratio setting portion 103 sends the gesture data 6A and the set unit change ratio R together with the signals SA to the screen display control portion 105.

As with the foregoing case, the screen display control portion 105 calculates the travel distance L based on the signals SA. The screen display control portion 105 calculates the product of the travel distance L thus calculated and the unit change ratio R set by the unit change ratio setting portion 103, and then determines the product to be the change ratio P.

Where the user intends to enlarge, in the scanned image 7 reduced by the (N-1)-th gesture, a part displayed as the preview window 5, in other words, where the result indicated in the gesture data 6A is the pinch-out gesture, the screen display control portion 105 enlarges that scanned image 7 by an amount corresponding to the change ratio P. The screen display control portion 105 displays, in the touch-sensitive panel display 10e, as the preview window 5, a part of the enlarged scanned image 7 in such a manner that both of the conditions (1_1) and (1_2) are satisfied.

Where the user intends to reduce, in the scanned image 7 enlarged by the (N-1)-th gesture, a part displayed as the preview window 5, in other words, where the result indicated in the gesture data 6A is the pinch-in gesture, the screen display control portion 105 reduces that scanned image 7 by an amount corresponding to the change ratio P. The screen display control portion 105 displays, in the touch-sensitive panel display 10e, as the preview window 5, a part of the reduced scanned image 7 in such a manner that both of the conditions (2_1) and (2_2) are satisfied.

The description is provided below, based on the foregoing content, as to how the unit change ratio R and the last unit change ratio RA are set when the user makes pinch-out or pinch-in gestures successively.

Suppose that: the user successively makes a pinch-out gesture, a pinch-out gesture, a pinch-out gesture, a pinch-in gesture, and a pinch-out gesture; and the elapsed time TA for each of the gestures is less than the predetermined time TB.

In such a case, the unit change ratios R are set as shown in FIG. 10. To be specific, for the first gesture, the initial value RV "10%" is set as the unit change ratio R and the last unit change ratio RA.

For the second gesture, the large unit change ratio RB "20%", which is the sum of the last unit change ratio RA "10%" and the initial value RV "10%", is set as the unit change ratio R and the last unit change ratio RA. For the third gesture, the large unit change ratio RB "30%", which is the sum of the last unit change ratio RA "20%" and the initial value RV "10%", is set as the unit change ratio R and the last unit change ratio RA.

For the fourth gesture, the small unit change ratio RC "20%", which is the value (difference) obtained by deducting the initial value RV "10%" from the last unit change ratio RA "30%", is set as the unit change ratio R and the last unit change ratio RA. For the fifth gesture, the small unit change ratio RC "10%", which is the value (difference) obtained by deducting the initial value RV "10%" from the last unit change ratio RA "20%", is set as the unit change ratio R and the last unit change ratio RA.

[Flow of the Entire Processing]

Figure 11:
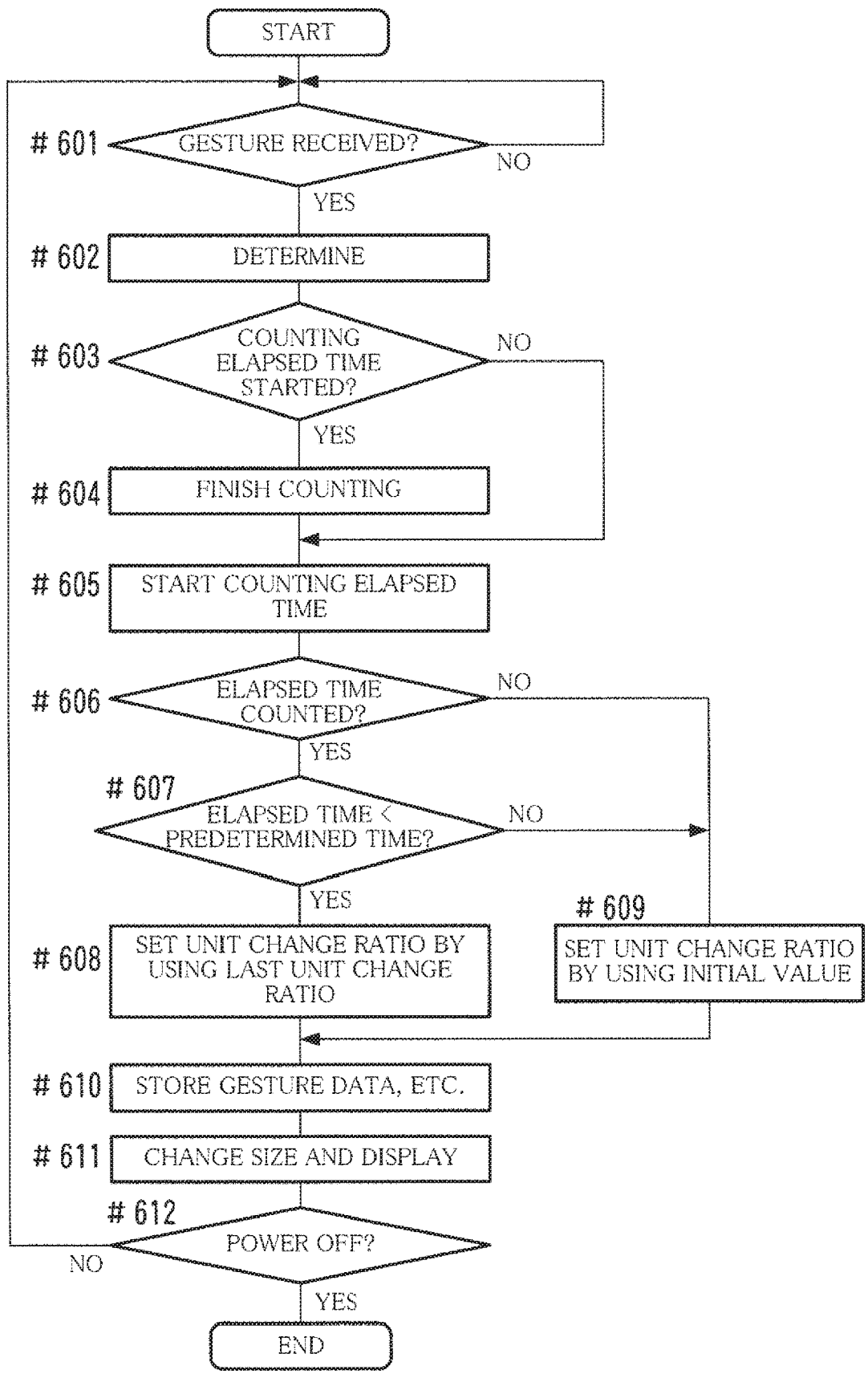
FIG. 11 is a flowchart depicting an example of the flow of the entire processing by an image forming apparatus.

FIG. 11 is a flowchart depicting an example of the flow of the entire processing by the image forming apparatus 1. The description goes on to the flow of the processing by the image forming apparatus 1 with reference to FIG. 11.

The image forming apparatus 1 receives a gesture made by the user (hereinafter, referred to as "the current gesture") (YES in Step #601). The image forming apparatus 1 determines whether or not the gesture corresponds to any one of the pinch-out gesture and the pinch-in gesture (Step #602).

Where counting elapsed time TA for a gesture received immediately before the current gesture (hereinafter, referred to as "the last gesture") has already started, in other words, where the last gesture corresponds to any one of the pinch-out and pinch-in gestures (YES in Step #603), the image forming apparatus 1 finishes counting the elapsed time TA (Step #604).

The image forming apparatus 1 starts counting elapsed time TA for the current gesture (Step #605). Where counting the elapsed time TA for the last gesture has not started yet, in other words, where the current gesture corresponds to the first pinch-in gesture or the first pinch-out gesture (NO in Step #603), the image forming apparatus 1 starts counting the elapsed time TA for the current gesture.

Where the elapsed time TA for the last gesture is less than the predetermined time TB (YES in Step #606, and YES in Step #607), the image forming apparatus 1 calculates the large unit change ratio RB as long as the last gesture is the same as the current gesture. Where the elapsed time TA for the last gesture is less than the predetermined time TB (YES in Step #606, and YES in Step #607), the image forming apparatus 1 calculates the small unit change ratio RC by using the last unit change ratio RA as long as the last gesture and the current gesture are different from each other. The image forming apparatus 1 then sets the result of calculation as the unit change ratio R (Step #608).

Where not counting the elapsed time TA for the last gesture (NO in Step #606), the image forming apparatus 1 sets the initial value RV as the unit change ratio R (Step #609). Where the elapsed time TA for the last gesture exceeds the predetermined time TB (NO in Step #607), or, alternatively, where the elapsed time TA exceeds the predetermined time TB and counting the elapsed time TA is suspended, the image forming apparatus 1 sets the initial value RV as the unit change ratio R in a manner similar to the above.

The image forming apparatus 1 deletes the last gesture data 6B and the last unit change ratio RA, stores the latest gesture data 6A as new last gesture data 6B, and stores the latest unit change ratio R as new last unit change ratio RA (Step #610).

The image forming apparatus 1 uses the signal S and the unit change ratio R to calculate the change ratio P. If the current gesture corresponds to the pinch-out gesture, then the image forming apparatus 1 uses the change ratio P to enlarge the scanned image 7. If the current gesture corresponds to the pinch-in gesture, then the image forming apparatus 1 uses the change ratio P to reduce the scanned image 7. The image forming apparatus 1 then displays, as the preview window 5, a part of the post-enlargement scanned image 7 or the post-reduction scanned image 7 in the touch-sensitive panel display 10e (Step #611).

The image forming apparatus 1 performs the processing appropriately before the image forming apparatus 1 is turned OFF (NO in Step #612).

As discussed above, according to this embodiment, it is possible to reduce the burden on a user when he/she makes a pinch-out or pinch-in gesture to enlarge or reduce a screen, as compared to the conventional technologies.

[Other Embodiments]

Figure 14A:
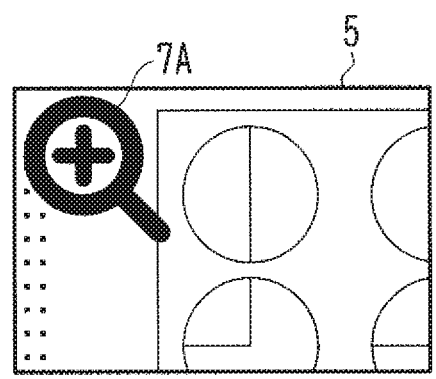
FIGS. 14A and 14B are diagrams showing examples as to how an icon changes.
Figure 14B:
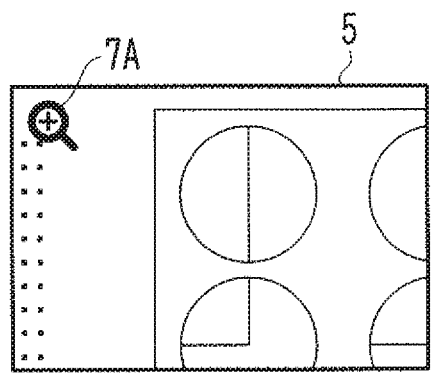
Figure 15A:
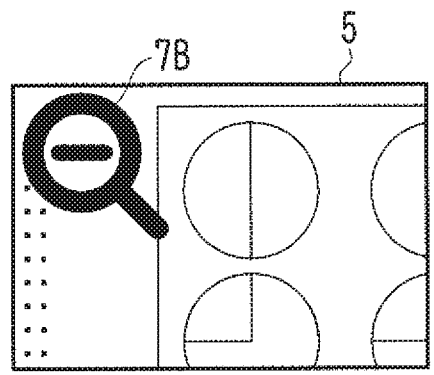
FIGS. 15A and 15B are diagrams showing examples as to how an icon changes.
Figure 15B:
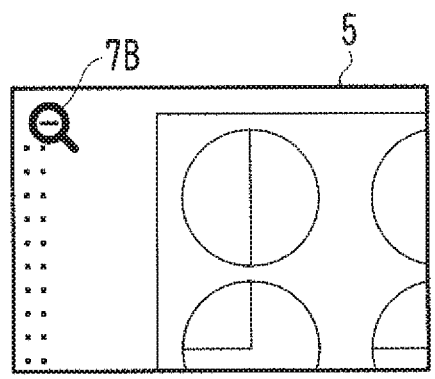

FIG. 12 is a diagram showing an example of the transition of the unit change ratio R. FIG. 13 is a diagram showing an example of the initial values RV set in accordance with a combination of a speed of a finger movement and a resolution level of the scanned image 7. FIGS. 14A and 14B are diagrams showing examples as to how an icon 7A changes. FIGS. 15A and 15B are diagrams showing examples as to how an icon 7B changes.

In the foregoing embodiments, the unit change ratio setting portion 103 calculates the small unit change ratio RC to set the small unit change ratio RC as the unit change ratio R when the result of determination indicated in the gesture data 6A is different from the result of determination indicated in the last gesture data 6B.

The unit change ratio setting portion 103, however, may set the initial value RV, as-is, as the unit change ratio R, as with the case where the elapsed time TA exceeds the predetermined time TB, or, alternatively, as with the case where the unit change ratio setting portion 103 is informed that the counting has been suspended. In short, the unit change ratio setting portion 103 may reset the unit change ratio R without calculating the small unit change ratio RC.

In such a case, suppose that: first, the user makes a pinch-out gesture, second, makes a pinch-out gesture, third, makes a pinch-out gesture, fourth, makes a pinch-in gesture, and then, fifth, makes a pinch-in gesture. It is noted that, in the premises, the initial value RV is "10%", the large unit change ratio RB is calculated in the same manner as described above, and the elapsed time TA is less than the predetermined time TB.

The unit change ratio R and the last unit change ratio RA are then set as shown in FIG. 12. To be specific, for the first gesture, "10%" is set as the unit change ratio R and the last unit change ratio RA. For the second gesture, "20%" is set as the unit change ratio R and the last unit change ratio RA. For the third gesture, "30%" is set as the unit change ratio R and the last unit change ratio RA.

Since the fourth gesture is different from the first gesture, the initial value RV is set, as-is, as the unit change ratio R and the last unit change ratio RA. Stated differently, the initial value RV "10%" is set as the unit change ratio R and the last unit change ratio RA. For the fifth gesture, the large unit change ratio RB "20%", which is the sum of the last unit change ratio RA "10%" and the initial value RV "10%", is set as the unit change ratio R and the last unit change ratio RA.

In the foregoing embodiments, one preset value is set as the initial value RV. Instead of this, however, any of values may be set selectively as the initial value RV as describe below.

In response to a pinch-out or pinch-in gesture made by the user, the speed of a movement of user's finger may be calculated and the initial value RV may be set in accordance with the speed. For example, if the speed of a movement of user's finger is equal to or higher than a predetermined speed (average speed of a finger movement, for example), then the initial value RV is set at 20%. If the speed of a movement of user's finger is lower than the predetermined speed, then the initial value RV is set at 10%.

Alternatively, the initial value RV may be set in accordance with a resolution level of the scanned image 7. For example, if the resolution of the scanned image 7 is equal to or higher than a predetermined level of resolution, then the initial value RV is set at 20%. If the resolution of the scanned image 7 is lower than the predetermined level of resolution, then the initial value RV is set at 5%.

The user sometimes makes the pinch-out gestures a plurality of times to enlarge a part of an image for checking the part in detail. As the image has a higher resolution, the user makes the pinch-out gestures more. In this way, the initial value RV is set at a high value in accordance with the resolution level of the image. This enables the user to, in enlarging the image, reduce the number of times of pinch-out gesture as compared with the case where the initial value RV is set at a constant value.

Another arrangement is possible in which the unit change ratio setting portion 103 sets the initial value RV in accordance with a combination of the speed of a finger movement and the resolution level of the scanned image 7.

For example, as shown in FIG. 13, if the speed of a finger movement is higher than the average speed, and further, if a screen resolution is higher than the predetermined resolution, then the initial value RV is set at 20%. If the speed of a finger movement is lower than the average speed, and further, if a screen resolution is lower than the predetermined resolution, then the initial value RV is set at 5%.

In the foregoing embodiments, in displaying a part of the scanned image 7 in the touch-sensitive panel display 10e as the preview window 5, the screen display control portion 105 may also display an icon that shows a level of the unit change ratio R in the preview window 5.

For example, for enlargement of the scanned image 7, the screen display control portion 105 displays the icon 7A in a size larger than the normal size as shown in FIG. 14A if the unit change ratio R is a predetermined value or greater. For enlargement of the scanned image 7, the screen display control portion 105 displays the icon 7A in the normal size as shown in FIG. 14B if the unit change ratio R is smaller than the predetermined value.

For example, for reduction of the scanned image 7, the screen display control portion 105 displays the icon 7B in a size larger than the normal size as shown in FIG. 15A if the unit change ratio R is the predetermined value or greater. For reduction of the scanned image 7, the screen display control portion 105 displays the icon 7B in the normal size as shown in FIG. 15B if the unit change ratio R is smaller than the predetermined value. The screen display control portion 105 may display the icon 7B in a size smaller than the normal size if the unit change ratio R is the predetermined value or greater.

Instead of changing the icon size, the screen display control portion 105 may change the animation speed of the icon.

Suppose that the icon 7A has a rotating "+" part. In such a case, if the unit change ratio R is greater than the predetermined value, then the screen display control portion 105 displays the icon 7A with the "+" part rotated at a speed higher than a predetermined speed. If the unit change ratio R is smaller than the predetermined value, then the screen display control portion 105 displays the icon 7A with the "+" part rotated at a speed lower than the predetermined speed.

Suppose that the icon 7B has a rotating "−" part. In such a case, if the unit change ratio R is greater than the predetermined value, then the screen display control portion 105 displays the icon 7B with the "−" part rotated at a speed higher than the predetermined speed. If the unit change ratio R is smaller than the predetermined value, then the screen display control portion 105 displays the icon 7B with the "−" part rotated at a speed lower than the predetermined speed.

In the foregoing embodiments, the unit change ratio setting portion 103 may set the initial value RV as the unit change ratio R for the case where the pinch-out or pinch-in gesture is made the (N-1)-th time and gestures other than the pinch-out and pinch-in gestures, e.g., a flick, is made the N-th time.

In the foregoing embodiments, the screen display control portion 105 calculates the product of the unit change ratio R and the travel distance L to use the calculated product as the change ratio P. In other words, the screen display control portion 105 calculates the change ratio P by multiplying the unit change ratio R and the travel distance L together. Instead of this, however, another method may be used to calculate the change ratio P as long as the change ratio P is greater in proportion to increase in the number of times of successive pinch-out gestures or in proportion to increase in the number of times of successive pinch-in gestures with the finger movement each time remaining unchanged.

For example, the change ratio P may be calculated by using any one of Equation (1) and Equation (2) provided below.

$$P = \alpha \times C^2 \quad (1)$$

$$P = \alpha \times C^{0.5} \quad (2)$$

wherein "α" is a percentage figure and a constant; "C" represents the number of times of successive pinch-out gestures or the number of times of successive pinch-in gestures; and "C^X" represents the X-th power of C.

Alternatively, for enlargement, the change ratio P may be calculated by using a magnification determined by Equation (3) provided below. For reduction, the change ratio P may be calculated by using a magnification determined by Equation (4) provided below.

$$P = \alpha \times (DA/DB) \quad (3)$$

$$P = \alpha \times (DB/DA) \quad (4)$$

wherein "DB" represents a distance between the fingertips of the two fingers at the start of a pinch-out or pinch-in gesture; "DA" represents a distance between the fingertips of the two fingers at the completion of the pinch-out or pinch-in gesture.

In the foregoing embodiments, the screen display control portion 105 uses a magnification (enlargement factor) of (100+P) % to enlarge the scanned image 7, and uses a magnification (reduction factor) of (100−P) % to reduce the scanned image 7. Instead of this, however, another method may be used for the calculation as long as the magnification is higher in proportion to increase in the number of times of successive pinch-out gestures or as long as the magnification is lower in proportion to increase in the number of times of successive pinch-in gestures.

For example, for enlargement, the change ratio P may be calculated by using a magnification determined by Equation (5) provided below. For reduction, the change ratio P may be calculated by using a magnification determined by Equation (6) provided below.

$$\text{Magnification} = (\beta \times C \times M) \times 100\% \quad (5)$$

$$\text{Magnification} = (1 - (\gamma \times C \times M)) \times 100\% \quad (6)$$

wherein "β" and "γ" each represents a magnification per minimum value of a distance of a finger movement which can be discerned as the pinch-out or pinch-in gesture. Such a minimum value is hereinafter referred to as a "minimum unit distance". In Equations (5) and (6), "β" is a value greater than 1 ("1.01" for example), "γ" is a value smaller than 1 and close to 0 (zero) ("0.01" for example), and "M" is the quotient obtained by dividing the travel distance L by the minimum unit distance.

It is to be understood that the overall configuration of the image forming apparatus 1, the constituent elements thereof, the content of the processing, the order of the processing, the structure of the data, and the like may be appropriately modified without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus which enlarges or reduces an image in accordance with an operation on a touch-sensitive panel display to display the image on the touch-sensitive panel display, the image processing apparatus comprising:
    a memory; and
    a hardware processor configured to:
        when an N-th gesture (N≥2) is a pinch-out gesture, enlarge the image, which has been enlarged in response to an (N-1)-th gesture, at a magnification higher than a magnification used for the (N-1)-th gesture to display a resulting image on the touch-sensitive panel display, provided that the (N-1)-th gesture is also the pinch-out gesture and that the two pinch-out gestures use a same number of touch points on the touch-sensitive panel display, and
        when the N-th gesture is a pinch-in gesture, reduce the image, which has been reduced in response to the (N-1)-th gesture, at a magnification lower than a magnification used for the (N-1)-th gesture to display a resulting image on the touch-sensitive panel display, provided that the (N-1)-th gesture is also the pinch-in gesture and that the two pinch-in gestures use a same number of touch points on the touch sensitive panel display.

2. The image processing apparatus according to claim 1, wherein:
    the hardware processor is further configured to set a unit change ratio that is a ratio specifying a percentage by which the image is to be enlarged or reduced per predetermined distance of a finger movement on the touch-sensitive panel display,
    the hardware processor sets a first unit change ratio as the unit change ratio for the (N-1)-th gesture, and the hardware processor sets a second unit change ratio as the unit change ratio for the N-th gesture,
    when the N-th gesture is the pinch-out gesture, the hardware processor enlarges the image, which has been enlarged or reduced in response to the (N-1)-th gesture, by an amount corresponding to a change ratio that is determined based on the second unit change ratio and a distance of a finger movement for the N-th gesture on the touch-sensitive panel display, and displays a resulting image on the touch-sensitive panel display, when the N-th gesture is the pinch-in gesture, the hardware processor reduces the image, which has been enlarged or reduced in response to the (N-1)-th gesture, by an amount corresponding to the change ratio that is determined based on the second unit change ratio and the distance of the finger movement for the N-th gesture on the touch-sensitive panel display, and displays a resulting image on the touch-sensitive panel display, and when each of the (N-1)-th gesture and the N-th gesture is the pinch-out gesture or the pinch-in gesture, the hardware processor sets a ratio greater than the first unit change ratio as the second unit change ratio.

3. The image processing apparatus according to claim 2, wherein the hardware processor sets, as the second unit change ratio, a sum of the first unit change ratio and a predetermined value.

4. The image processing apparatus according to claim 3, wherein:

the hardware processor sets, as the second unit change ratio, a sum of the first unit change ratio and a first predetermined value when a speed of a movement of a finger for the N-th gesture is higher than a predetermined speed, and the hardware processor sets, as the second unit change ratio, a sum of the first unit change ratio and a second predetermined value smaller than the first predetermined value when the speed of the movement of the finger for the N-th gesture is lower than the predetermined speed.

5. The image processing apparatus according to claim 2, wherein:

in a first-time gesture, the hardware processor sets a predetermined ratio as an initial unit change ratio that is the unit change ratio for the first-time gesture, when the first-time gesture is the pinch-out gesture, the hardware processor enlarges the image by an amount corresponding to a change ratio that is determined based on the initial unit change ratio and a distance of a finger movement for the first-time gesture on the touch-sensitive panel display, and displays a resulting image on the touch-sensitive panel display, and when the first-time gesture is the pinch-in gesture, the hardware processor reduces the image by an amount corresponding to the change ratio that is determined based on the initial unit change ratio and the distance of the finger movement for the first-time gesture on the touch-sensitive panel display, and displays a resulting image on the touch-sensitive panel display.

6. The image processing apparatus according to claim 5, wherein:

the hardware processor sets, as the initial unit change ratio, a first ratio when a resolution level of the image is higher than a predetermined level of resolution, and the hardware processor sets, as the initial unit change ratio, a second ratio lower than the first ratio when the resolution level of the image is lower than the predetermined level of resolution.

7. The image processing apparatus according to claim 5, wherein the hardware processor sets, as the second unit change ratio, a sum of the first unit change ratio and the initial unit change ratio.

8. The image processing apparatus according to claim 2, wherein the hardware processor sets, as the second unit change ratio, a ratio smaller than the first unit change ratio when any one of the (N-1)-th gesture and the N-th gesture is the pinch-out gesture and the other is the pinch-in gesture.

9. The image processing apparatus according to claim 5, wherein the hardware processor sets, as the second unit change ratio, a ratio that is smaller than the first unit change ratio and is equal to or greater than the initial unit change ratio when any one of the (N-1)-th gesture and the N-th gesture is the pinch-out gesture and the other is the pinch-in gesture.

10. The image processing apparatus according to claim 5, wherein the hardware processor sets, as the second unit change ratio, the initial unit change ratio when any one of the (N-1)-th gesture and the N-th gesture is the pinch-out gesture and the other is the pinch-in gesture.

11. The image processing apparatus according to claim 2, wherein the hardware processor is further configured to display, together with the image, an icon that represents enlargement or reduction in the image in a form according to a level of the second unit change ratio.

12. The image processing apparatus according to claim 11, wherein:

the hardware processor displays the icon at a first size when the second unit change ratio is equal to or greater than a third ratio, and the hardware processor displays the icon at a second size smaller than the first size when the second unit change ratio is smaller than the third ratio.

13. The image processing apparatus according to claim 11, wherein:

the hardware processor displays the icon with the icon changing at a first speed when the second unit change ratio is equal to or greater than a third ratio, and the hardware processor displays the icon with the icon changing at a second speed lower than the first speed when the second unit change ratio is smaller than the third ratio.

14. The image processing apparatus according to claim 1, further comprising a scanner unit, wherein the hardware processor is further configured to display, as the image, an image captured by the scanner unit on the touch-sensitive panel display.

15. An image displaying method which enlarges or reduces an image in accordance with an operation on a touch-sensitive panel display to display the image on the touch-sensitive panel display, the method comprising:

when an N-th gesture (N≥2) is a pinch-out gesture, enlarging the image, which has been enlarged in response to an (N-1)-th gesture, at a magnification higher than a magnification used for the (N-1)-th gesture to display a resulting image on the touch-sensitive panel display, provided that the (N-1)-th gesture is also the pinch-out gesture and that the two pinch-out gestures use a same number of touch points on the touch-sensitive panel display; and when the N-th gesture is a pinch-in gesture, reducing the image, which has been reduced in response to the (N-1)-th gesture, at a magnification lower than a magnification used for the (N-1)-th gesture to display a resulting image on the touch-sensitive panel display, provided that the (N-1)-th gesture is also the pinch-in gesture and that the two pinch-in gestures use a same number of touch points on the touch-sensitive panel display.

16. A non-transitory recording medium storing a computer readable program executable by a computer of an image processing apparatus which enlarges or reduces an image in accordance with an operation on a touch-sensitive panel display to display the image on the touch-sensitive panel display, the computer readable program being executable by the computer to cause the image processing apparatus to perform processes comprising:

when an N-th gesture (N≥2) is a pinch-out gesture, enlarging the image, which has been enlarged in response to an (N-1)-th gesture, at a magnification higher than a magnification used for the (N-1)-th gesture to display a resulting image on the touch-sensitive panel display, provided that the (N-1)-th gesture is also the pinch-out gesture and that the two pinch-out gestures use a same number of touch points on the touch-sensitive panel display; and when the N-th gesture is a pinch-in gesture, reducing the image, which has been reduced in response to the (N-1)-th gesture, at a magnification lower than a magnification used for the (N-1)-th gesture to display a resulting image on the touch-sensitive panel display, provided that the (N-1)-th gesture is also a pinch-in gesture and that the two pinch-in gestures use a same number of touch points on the touch-sensitive panel display.

* * * * *